(No Model.)

C. H. BODURTHA.
REVERSIBLE MOLDING FOR FRAMES.

No. 266,755. Patented Oct. 31, 1882.

WITNESSES:
Theo. G. Hoster
C. Sedgwick

INVENTOR:
C. H. Bodurtha
BY Munn & Co
ATTORNEYS.

UNITED STATES PATENT OFFICE.

CHARLES H. BODURTHA, OF DELAWARE, OHIO.

REVERSIBLE MOLDING FOR FRAMES.

SPECIFICATION forming part of Letters Patent No. 266,755, dated October 31, 1882.

Application filed March 21, 1882. (No model.)

*To all whom it may concern:*

Be it known that I, CHARLES H. BODURTHA, of Delaware, in the county of Delaware and State of Ohio, have invented a new and Improved Reversible Molding for Frames, of which the following is a full, clear, and exact description.

Heretofore picture-frame moldings have been manufactured with a rabbet in one longitudinal edge only, and in making frames from such moldings a piece of molding in length equal to twice the width of the molding is lost and wasted for each corner of the frame.

The object of my invention is to obviate this loss of material, and to produce an improved picture-frame molding from which the frames can be made without wasting any part of the molding.

The invention consists in a molding provided in each edge with a longitudinal cut, and with a cut parallel with each edge in the inner surface of the molding, whereby a rabbet can be formed in either edge of the molding by deepening these cuts sufficiently to loosen the strip of wood between the two cuts. With this molding a loss of material in making the frame is obviated, as there is no necessity of cutting a triangular piece out of the molding for each corner of the frame, as has been necessary in making frames of moldings having a rabbet on one edge only.

Reference is to be had to the accompanying drawings, forming a part of this specification, in which similar letters of reference indicate corresponding parts in all the figures.

Figure 1:
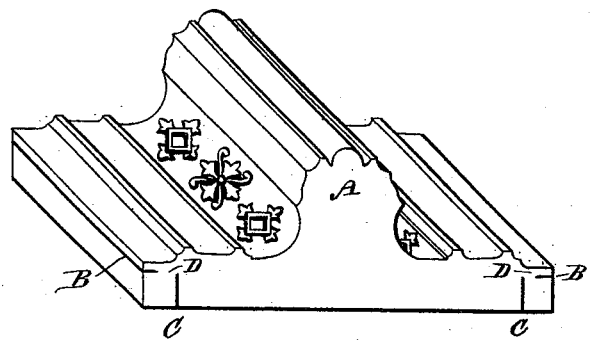
Figure 2:
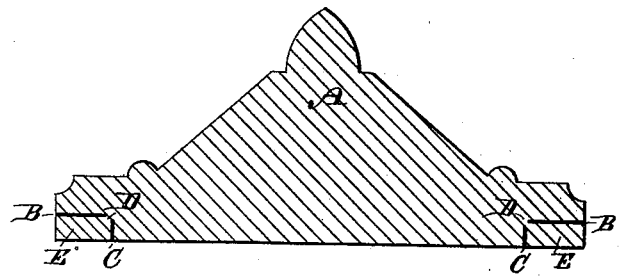
Figure 3:
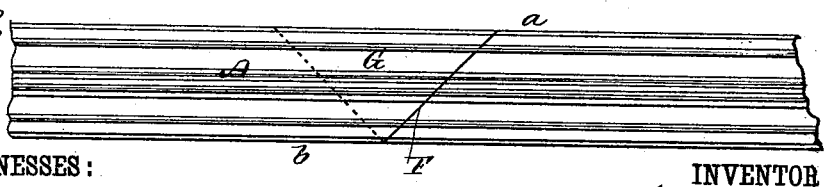

Figure 1 is a sectional perspective view of a piece of my improved reversible molding for frames. Fig. 2 is a cross-sectional elevation of a similar piece of molding of a different design. Fig. 3 is a plan view of a strip of this molding.

The ornamentation on the outer surface of the molding A is symmetrical in regard to the longitudinal central line of the molding. This ornamentation may be raised or recessed in colors or plain, and may be of any desired character. The molding is provided with a longitudinal cut, B, in each longitudinal edge near the top of the same, and the under or inner surface of the molding is provided with a cut, C, at each side parallel with the longitudinal edges of the molding and a short distance from the same, the cuts C being at right angles to the cuts B, and the inner ends of these cuts being separated by a slight thickness of wood, D, as shown in Figs. 1 and 2. By means of a knife or blade passed along in the cuts B or C these cuts can be deepened sufficiently to loosen the strip E or wood between the two cuts B and C from the molding, thus forming a rabbet. As the molding is provided with the cuts B and C at each edge, a rabbet can be made in either edge of the molding, as may be desired.

To form frames the moldings are generally cut at an angle of forty-five degrees, as shown by the full line F in Fig. 3, the rabbet being at the edge *a*. If the molding would be provided with a rabbet at the edge *a* only, a triangular piece, G, would have to be cut out of the molding, as shown in Fig. 3, which piece is waste, and as it is equal in length to twice the width of the molding it is evident that a considerable quantity of the molding would be wasted in making a frame. I cut my improved molding, as indicated by the line F, and then form a rabbet in the edge *a* of the molding in that part of the same to the right of cut F, in the manner described above, and then form a rabbet, in the manner described, in the edge *b* of that part of the molding to the left of the cut F, and the beveled ends of the two pieces of molding are then placed against each other in such a manner that the ends of the rabbets in the edges *a* and *b* will meet. In this manner the entire frame is formed. It is evident that no part of the molding is wasted. Octagon or other like frames can be made in a similar manner. The outer edges of the moldings are left uncut, which leaves the outer edge of the frame in a finished condition. The brads used in fastening the corners together pass through the partially-cut pieces, thereby securing the same more perfectly to the frame.

Having thus described my invention, I claim as new and desire to secure by Letters Patent—

1. As an improved article of manufacture, a molding made, substantially as herein shown and described, with a longitudinal cut, B, in each edge, and with a cut, C, in the inner surface parallel with each edge, whereby a rabbet can be formed in either edge by deepening the cuts sufficiently to loosen the strip of wood between the cuts, as set forth.

2. A molding having its outer surface made symmetrical with the longitudinal central line of the molding, which molding is provided with longitudinal cuts in the edges, and with cuts C parallel with the edges in the inner surface, substantially as herein shown and described, and for the purpose set forth.

3. A frame made of moldings having a longitudinal cut in each edge, and a cut, C, parallel with each edge in the inner surface of the molding, substantially as herein shown and described, whereby a frame can be formed without wasting any of the material, as set forth.

CHARLES H. BODURTHA.

Witnesses:
E. D. ROBERT,
W. A. HALL.